(12) United States Patent
Angelsen

(10) Patent No.: US 10,310,061 B2
(45) Date of Patent: Jun. 4, 2019

(54) ULTRASOUND TRANSDUCER AND METHOD OF MANUFACTURING

(71) Applicant: Bjorn A. J. Angelsen, Trondheim (NO)

(72) Inventor: Bjorn A. J. Angelsen, Trondheim (NO)

(73) Assignee: SURF Technology AS, Trondheim (NO)

( * ) Notice: Subject to any disclaimer, the term of this patent is extended or adjusted under 35 U.S.C. 154(b) by 305 days.

(21) Appl. No.: 15/191,246

(22) Filed: Jun. 23, 2016

(65) Prior Publication Data

US 2016/0363656 A1 Dec. 15, 2016

Related U.S. Application Data

(63) Continuation of application No. PCT/GB2014/053454, filed on Nov. 21, 2014.

(30) Foreign Application Priority Data

Nov. 21, 2013 (GB) .................... 1320594.3

(51) Int. Cl.
*G01S 7/521* (2006.01)
*G10K 11/02* (2006.01)
(Continued)

(52) U.S. Cl.
CPC ............... *G01S 7/521* (2013.01); *B32B 5/16* (2013.01); *B32B 15/16* (2013.01); *G10K 11/02* (2013.01); *B06B 1/02* (2013.01); *B32B 2260/025* (2013.01); *B32B 2260/046* (2013.01); *B32B 2264/02* (2013.01); *B32B 2264/105* (2013.01); *B32B 2264/107* (2013.01); *B32B 2264/12* (2013.01); *B32B 2307/10* (2013.01);
(Continued)

(58) Field of Classification Search
CPC ......... G01S 7/521; G10K 11/02; B32B 15/16; B32B 5/16; B32B 2264/105; B32B 2307/10; B32B 2264/12; B32B 2307/302; B32B 2307/202; B32B 2264/02; B32B 2260/046; B32B 2260/025; B32B 2307/20; B32B 2264/107; B06B 1/02
See application file for complete search history.

(56) References Cited

U.S. PATENT DOCUMENTS

| 2009/0062656 | A1 | 3/2009 | Hyuga | |
| 2012/0195004 | A1* | 8/2012 | Miller | C08J 9/0066 361/705 |
| 2016/0363656 | A1* | 12/2016 | Angelsen | B32B 5/16 |

FOREIGN PATENT DOCUMENTS

| EP | 0 119 855 | 9/1984 |
| EP | 0 589 396 | 3/1994 |

(Continued)

OTHER PUBLICATIONS

Gregory et al.; High Density Interconnect for Polymer Based Ultrasound Transducers; pp. 2215-2218; https://ieeexplore.ieee.org/stamp/stamp.jsp?tp=&arnumber=1418279. (Year: 2004).*

*Primary Examiner* — Daniel Pihulic
(74) *Attorney, Agent, or Firm* — Cozen O'Connor

(57) ABSTRACT

An ultrasound transducer array with at least one composite material layer. The layer having a polymer base in which polymer particles are embedded. The polymer particles are coated with a material that has a thermal conductivity that is higher than the thermal conductivity of the polymer base and the polymer particles.

28 Claims, 10 Drawing Sheets

(51) Int. Cl.
*B32B 5/16* (2006.01)
*B32B 15/16* (2006.01)
*B06B 1/02* (2006.01)

(52) U.S. Cl.
CPC ..... *B32B 2307/20* (2013.01); *B32B 2307/202* (2013.01); *B32B 2307/302* (2013.01)

(56) References Cited

FOREIGN PATENT DOCUMENTS

| | | | |
|---|---|---|---|
| JP | S62 118700 | 5/1987 | |
| JP | 2005 198261 | 7/2005 | |
| JP | 2009 071393 | 4/2009 | |
| WO | WO 2007/061216 | 5/2007 | |
| WO | WO-2015075471 A3 * | 7/2015 | ............... B32B 5/16 |

* cited by examiner

ULTRASOUND TRANSDUCER AND METHOD OF MANUFACTURING

REFERENCE TO RELATED APPLICATION

This application is a continuation of PCT application No. PCT/GB2014/053454 filed on Nov. 21, 2014, which claims priority from UK application No. 1320594.3 filed on Nov. 21, 2013, the entire contents of both being incorporated by reference herein.

FIELD OF THE INVENTION

The invention addresses design and manufacturing methods of ultrasound transducers for improved heat drainage from the array.

DISCUSSION OF RELATED ART

The electro-acoustic transduction of current ultrasound transducer arrays is based on one of:
i) composites of polymers and ferroelectric ceramic materials, and
ii) vibrating membranes on the surface of a substrate material, such as Si, where the electro-mechanical coupling is either capacitive (cmut) or through layers of piezoelectric material (pmut).

To shape the bandwidth of the electro-acoustic transduction, and also for mechanical protection of the arrays, acoustic layers of polymer materials mixed with particles are used, where the type of polymer, particle and volume fill of the particles are selected for specified acoustic impedance and other characteristics of the acoustic layers.

The electro-acoustic transduction of the transducer arrays often has considerable power losses that produce heating of the transducer structure. To improve the heat sink capacity of the acoustic layers, metal particles or particles with high thermal conductivity ceramics or oxides mixed in a polymer base has been used by Devallencourt et al. (Chr. Devallencourt, S. Michau, C. Bantiginies N. Felix: "A 5-MHz piezo-composite ultrasound array for operations in high temperature and harsh environment" IEEE Ultrasonics Symposium 2004 and Chr. Devallencourt, F. Grimaud, S. Michau, N. Felix: "1-3 piezocomposite autoclavable transducers for medical and industrial applications." IEEE Ultrasonics Symposium 2006). However, as these particles have high characteristic acoustic impedance, the use of such particles makes it difficult to obtain a thermal conductivity>0.3 W/mK for layers with low or otherwise specifiable characteristic acoustic impedance.

Ferroelectric ceramic materials that are used for the electro-acoustic transduction generally have a thermal conductivity ~2 W/mK. However, these ceramics are used as part of the composites of polymer and ferroelectric ceramic materials, where the thermal conductivity is limited by the polymer properties, and it is difficult to obtain a thermal conductivity above 0.3 W/mK for the composite material, as reported in the above publications.

It is well known that when mixing ordinary shaped particles of a high conductivity material into a low conductivity matrix e.g. polymer adhesive, the effective thermal conductivity exhibits only a minor increase. Further improvements can be obtained by using needle or flake like particles, which is well known from silver filled conductive adhesives. But even in this case, the thermal conductivity reaches less than one tenth of what the corresponding volume fraction would suggest. That is, the added silver is very badly utilized, as the particle—particle contacts represents huge bottlenecks in the thermal transport. Also, adding metal particles to the base often increases the acoustic impedance of the composite material to unwanted values. The current invention presents solutions to these challenges.

SUMMARY OF THE INVENTION

The inventors have realized that it is desirable to improve the thermal conductivity of a composite polymer material comprising a polymer base and thermally conducting particles to obtain predetermined thermal conductivity and acoustic properties of the composite material. An overview of the invention is presented. The overview is a short form and by no means represents limitations of the invention, which in its broadest aspect is defined by the claims appended hereto.

The invention presents materials with fairly low acoustic impedance (~1.5-5 MRayl) and high heat conductivity that are obtained by mixing polymer particles coated with a heat conducting layer in a polymer base material. The heat conducting layer on the particles can also be electrically isolating, making the composite material electrically isolating with good heat conductivity. The particles in the base material hence give a composite material where the thermal conductive material is utilized highly effectively. The result is a high heat conductivity where the characteristic acoustic impedance can be varied (optimized) by the changing the polymer core material type and the ratio of the polymer core and diameter to the thickness and material type of the coating layers. The heat conducting layer on the particles can be electrically conducting, making the material also electrically conducting that can have advantages in many situations, for example for electric shielding.

The invention further presents designs of transducer array structures that make use of such materials in acoustic layers of the structures to drain heat generated by the array. The invention further presents solutions where the cooling of the array is further improved by one or more of i) air-fins, and ii) Peltier elements, and iii) fluid cooling elements to further extract the heat removed from the array elements via said acoustic layers.

DETAILED DESCRIPTION OF EMBODIMENTS

Figure 1:
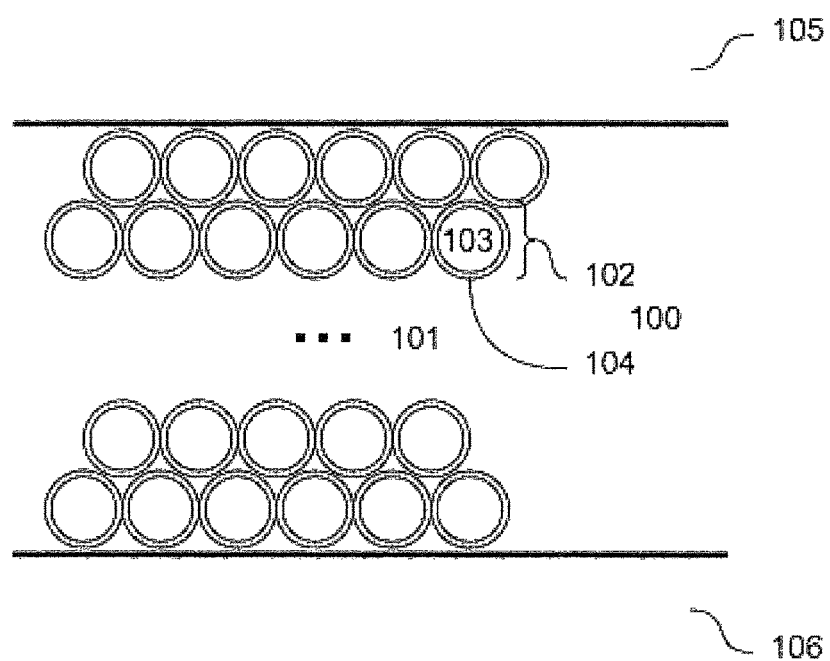
FIG. 1 Illustrates a heat conducting material composed of heat conducting particles in a heat isolating polymer base material.

According to an embodiment there is provided an ultrasound transducer array probe arranged as a layered structure comprising at least one layer of transducer array elements and at least one further layer mounted in acoustic and thermal contact with said layer of transducer elements. The further layer is a composite material layer comprising a polymer base and particles. The particles in turn comprise a polymer core coated with a surface layer of a material that is more thermally conductive than the polymer core.

The thermal conductivity of surface layer is preferably at least 10 times the thermal conductivity of the polymer core.

An overall thermal conductivity of the further layer may be determined by selecting at least one of i) a type of materials for the particle surface layer, and ii) a thickness of the particle surface layer, and iii) a dimension of the particle polymer core, and iv) a fill density of said particles in the polymer base.

Additionally or alternatively an acoustic property of the further layer is predetermined by selecting at least one of i) a type of material used to form the polymer base, and ii) a type of material used to form the particle polymer core, and iii) a dimension of the particle polymer core, and iv) a type of material or types of materials used to form the particle surface layer or layers, and v) a thickness of the particle surface layer, and vi) a fill density of particles in the polymer base.

The polymer core may comprise a porous polymer material.

The at least one further layer can participate in shaping the electro-acoustic transfer function of the array.

The at least one layer of transducer elements may comprise at least one of, i) piezo-ceramic materials, and ii) cmut/pmut technology.

The surface layer can include an electrically conducting material and wherein a packaging density of the particles within the acoustic layer can be such that the electrical conductivity of the surface layers of contacting particles renders the composite material layer electrically conductive.

The composite material layer may be part of a structure that provides an electrical connection to elements of the transducer array.

The layer of heat conductive material can include an electrically isolating material.

The surface layer may include an electrically conducting material coated with an electrically isolating material.

In one embodiment the at least one layer of transducer elements comprises a ceramic-polymer composite. The polymer is a composite material comprising a polymer base and particles that comprise a polymer core coated with a layer of a material that is more thermally conductive than the polymer core. An outer surface of the layer is electrically non-conductive.

The surface layer of heat conductive material can include layers improving adhesion between the polymer particle and a coating layer, or between coating layers.

The particles may be mono-disperse particles.

The polymer particles may be composed of at least two groups of particles, each with mono-disperse cores where the particles in different groups have different diameters.

The at least one further layer can be chosen to have a thickness so that it inverts the acoustic impedance at a center frequency of the layer of transducer elements. This further layer can be placed between the at least one electro-acoustic transduction layer and a heat draining layer.

The heat draining layer may comprise at least one semi-conductor layer with integrated electronics that are connect to array elements.

The ultrasound transducer array probe may further comprise at least one of i) air fin cooling, and ii) Peltier elements, and iii) fluid cooling that are arranged to remove heat from the probe.

Electrical connection between the integrated electronics and the array elements may be obtained with electrically connections extending through said at least one further layer.

An electrical connection between an array element and an associated electronic component may be established via a single one of the particles, wherein said surface layer of said single one of the particles is electrically conducting.

The composition and dimension of the single particles and surrounding fill material may be selected so that the single particle together with the surrounding fill material functions as an acoustic impedance inverting structure at a frequency within the transmit band of said array elements.

Electrical connection between array elements and associated electronic circuits can be obtained through an electrically anisotropic adhesive comprising large volume fill of thermally conducting particles that are electrically isolating, and a lower volume fill of electrically isolating particles. The electrically conducting particles may be larger than the electrically isolating particles. In this arrangement the electrically conducting particles can be larger than the electrically isolating particles.

The layer of transducer array elements can comprise a ceramic-polymer composite with the polymer component of the composite being formed by the electrically anisotropic adhesive.

The array probe can be configured to operate at two separate frequency bands, hereinafter referred to as higher frequency band and lower frequency band respectively. The at least one layer of transducer array elements can comprises an array operative in the higher frequency band and the at least one further layer and a further array operating in the lower frequency band can be provided on a side of the array operating in the higher frequency band that is opposite to an emission side of the array operating in the higher frequency band.

The at least one further layer between the arrays can comprise two composite material layers. Between the two composite material layers, a layer made of a material that has a thermal conductivity that is at least 10 times the thermal conductivity of said composite material layers may be provided. The composite material layers comprise a polymer base filled with particles comprising a polymer core that is coated with a surface layer of a material that is more thermally conductive than the polymer core.

According to another embodiment there is provided a method of manufacturing an ultrasound transducer array comprising selecting, for a composite material comprising a polymer base with embedded particles comprising a polymer core coated with a surface layer of material with higher thermal conductivity than the polymer core, at least one of an overall thermal conductivity of said composite material and an acoustic property of said composite material. The overall thermal conductivity of said composite material can be selected by selecting at least one of i) a type of materials for the particle surface layer, and ii) a thickness of the particle surface layer, and iii) a dimension of the particle polymer core, and iv) a volume fill of said particles in the polymer base. The acoustic property of said composite material can be selected by selecting at least one of i) a type of material in the polymer base, and ii) a type of material in the particle polymer core, and iii) a dimension of the particle polymer core, and iv) a type of materials in the particle surface layer, and v) a thickness of the particle surface layer, and vi) a volume fill of particles in the polymer base. The method further comprises creating a composite material layer according to said one or more selections and attaching said composite material layer to an ultrasound transducer array for heat conduction.

Example embodiments according to the invention are presented in the following.

This presentation is meant for illustration purposes only, and by no means represents limitations of the invention, which in its broadest aspect is defined by the claims appended hereto.

Polymer particles with a size distribution around a defined average in the range of 2-100 μm can be manufactured and such polymer particles are commercially available, for example from Dow Chemical Company. Mono-disperse polymer particles with diameters in the range of 2-100 μm can be manufactured with methods for example as described in U.S. Pat. Nos. 4,336,173 and 4,459,378 and such polymer particles are commercially available, for example from Conpart AS. The particles can be made of polymers with characteristic bulk acoustic impedance of the raw material typically in the range of 1.5-3.5 kg/m2s. The polymer particles can be made from for instance styrene, e.g. styrene cross-linked with divinylbenzene. Other styrene monomers of use in the invention include methylstyrene and vinyl toluene. Mixtures of styrene monomers may be used. Another option is particles prepared from acrylic acid esters, methacrylic acid esters, acrylic acids, methacrylic acids, acrylonitrile, methacrylonitrile, vinyl chloride, vinyl acetate and vinyl propionate. Mixtures of any of these monomers can also be used optionally together with the styrene monomers above. All monomers can be cross-linked with divinylbenzene or a diacrylic monomer such as ethane-diol-diacrylate. Some particles may require treatment with base to hydrolyze ester groups to allow cross-linking. The use of a cross-linking agent and hence the formation of a cross-linked particles is preferred.

According to an embodiment of the invention, the polymer particles are coated with layers of materials of high thermal conductivity of >50 W/mK or, more preferably of >100 W/mK, or, still more preferably, of >150 W/mK, for example the metals like Ag (429), Cu (401), Au (318), Al (237), Mg (156), Ni (91), or the electrically isolating materials AlN (285), BeO (330), where the numbers in parenthesis is the thermal conductivity of the material in W/mK. The electrical semiconductor Si has a high thermal conductivity of 149 W/mK with very low electrical conductivity for un-doped Si. By increasing the thickness of the coating layer, the characteristic bulk acoustic impedance of the spheres can be increased above the characteristic impedance of the polymer core, depending on the type of coating material and layer thickness. For further reducing the acoustic impedance, the polymer core can also be made porous, with a porosity of ~5-75%, where increased porosity will lower the acoustic impedance of the particles. Particles with dimensions ~200 nm can also be manufactured and coated with both metal and electrically isolating, thermally conductive material.

Figure 5:
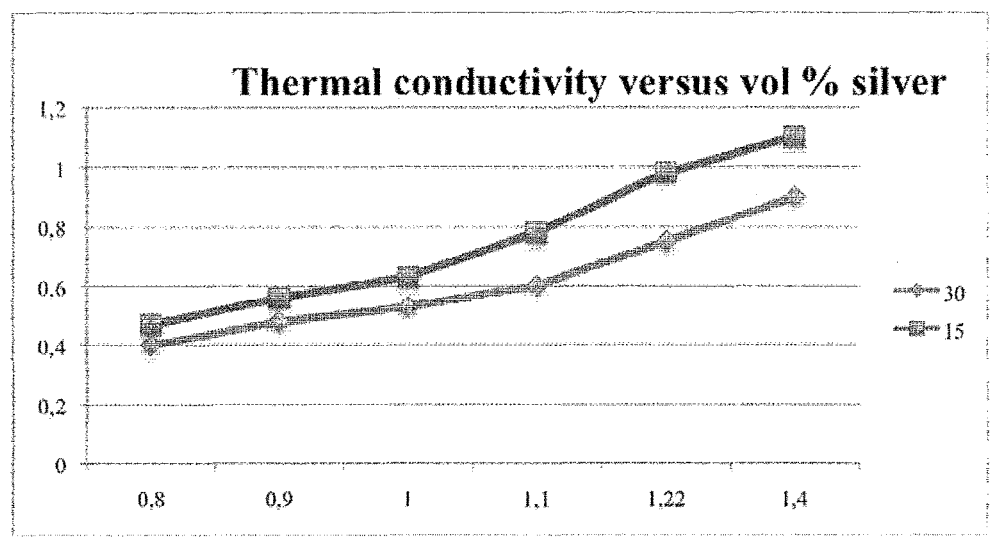

Mixing such coated particles into a hardenable polymer base material, such as, for example, a dual component polymer material or a single component polymer glue, can hence be used to create a composite material with heat conductivity and characteristic acoustic impedance that increases with the density/packing of the coated spheres in the base material, starting from that of the pure base material and upwards, depending on the thickness and type of the coating material, the type of material in the particle core, the particle size, and density of particles in the base material. Particles with a porous polymer core can be used for low increase of the acoustic impedance of the composite material with volume fill of particles, and even to lower the acoustic impedance with increase of the volume fill of the particles. The thermal conductivity and the characteristic acoustic impedance of the composite material can be increased by increasing the coating layer thickness, where FIG. 5 shows examples of how a thermal conductivity >1 W/mK can be obtained and other experiments have shown thermal conductivity >2 W/mK of the composite material. Similar thermal conductivities can be obtained with electrically isolating coating layers, providing an electrically isolating composite material. Such types of composite materials can be used as polymer fill in composites of polymers and ferroelectric ceramic materials, maintaining an average thermal conductivity of ~2 W/mK, i.e. similar to that of whole ferroelectric ceramic.

It will be appreciated that a high thermal conductivity can be achieved if the density of the particles is so high that a large number of the particles are in contact. This is shown in FIG. 1, where 100 shows a composite of a polymer base 101 with embedded particles 102 with a polymer core 103 coated with a metal layer 104. The composite material is positioned as a layer between two materials 105 and 106 and will with a temperature difference between these materials transport heat from the high to the low temperature material. The particles in the base hence gives a composite material with high thermal conductivity that together with the characteristic acoustic impedance varies with the volume fill of particles and the size and material type of the polymer particle core and the thickness and material type of the coating layers. It will be appreciated that, whilst FIG. 1 only shows particles 102 close to materials 105 and 106 the particles 102 can be provided throughout the space defined by materials 105 and 106.

With metal coating of the particles, contact between the particles also introduces an electrical conductivity of the particle-base composite material, which in some cases is useful and in other cases can be a disadvantage. In the last cases, the particles can be coated with an electrically isolating material with high thermal conductivity, for example AlN, BeO, Si and $Al_2O_3$. Deposition of such materials is however more complex and time consuming than deposition of a metal coating, and a practical solution is to provide a first layer of metal, such as Ag, Au, Cu, Al, Ni, that provides the bulk of the thermal conductivity, and coated with a thinner layer of electrically insulating material, preferably also with high thermal conductivity, for example as shown for the particle 200 in FIG. 2. In this FIG. 201 shows the polymer core of the particle, 202 shows a metal layer with high thermal and electrical conductivity, and 203 shows an electrically isolating material with high thermal conductivity. A Si layer 203 with low electrical conductivity and high heat conductivity can for example be obtained with well known chemical processes, for example Silanization. This process can also be used for coating with other types of electrically isolating materials. The particles coated with Au, Ag or Al layers, can be functionalized with an electrically insulating material via well-known methodologies such as thiol chemistry (either for direct covalent binding of an insulating monolayer or as a surface ligand for further reaction) and formation of an insulating layer by emulsion polymerization.

Figure 2:
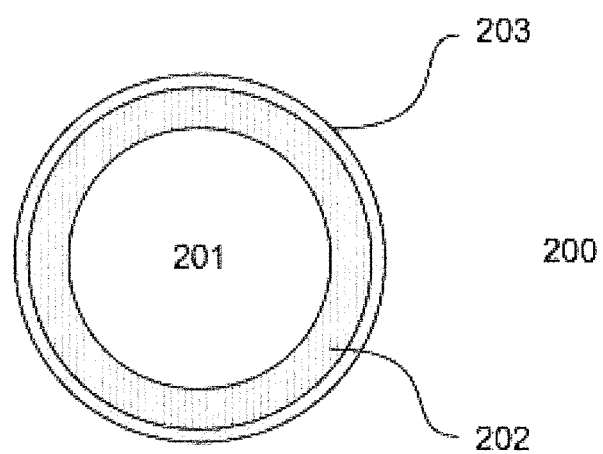
FIG. 2 Illustrates a heat conducting sphere with a polymer core covered with heat conducting layers.

Substituting the particles 102 of FIG. 1 with the particle 200 of FIG. 2 hence gives a composite material with high thermal conductivity but low electrical conductivity, that together with the characteristic acoustic impedance varies with the volume fill of particles and the thickness and material type of the coating layers. Si is also an interesting coating material with high thermal conductivity and low electrical conductivity. Si coated with a thin layer of $SiO_2$ gives particles with especially low electrical conductivity and high thermal conductivity.

Anisotropic glue is used for fastening for example integrated circuit chips to a substrate at the same type as making contact between contact bumps on the chips and conductors on the substrate. The anisotropic glue is made as a glue base filled with conducting particles at so low density that in the normal, bulk composite the electrical conductivity is low. However, when the glue is pressured between the conducting bump on the circuit chip and the conductor on the substrate, the glue base is squeezed out and the conducting particles make direct electric contact between the bumps and the conductors on the substrate, for example as described in H. Kristiansen, Z. L. Zhang and J. Liu, "Characterization of Mechanical Properties of Metal coated Polymer Spheres for Anisotropic Conductive Adhesive", IEEE Advanced Packaging Materials 2005, 0-7803-9085-7/05, Sec 8-2.

An anisotropic glue with increased thermal conductivity can be obtained by filling the glue base with a large volume fraction of thermally conducting but electrically isolating particles, for example as in FIG. 2, and a lower volume fraction of larger particles with an electrically conducting surface coating layer. The electrically conducting particles can preferably be larger than the electrically isolating particles so that the electrically conducting particles make contact between the conducting bumps on the integrated circuit chips and the conductors on the substrate surface, while the smaller, electrically isolating particles are squeezed out together with the glue base.

In addition to layers providing thermal and electrical conductivity, thin layers of for example Ni to increase the attachment between the polymer core and the surface layers, and also between the different surface layers, can be added. The outer layer can be covered with a protection layer that inhibits oxidization of the thermal conducting layers that could limit thermal conduction between particles in contact. Such protection layers can for example be made of the afore mentioned electrical insulating materials or "self assembled monolayer" (SAM) of organic molecules.

Figure 3:
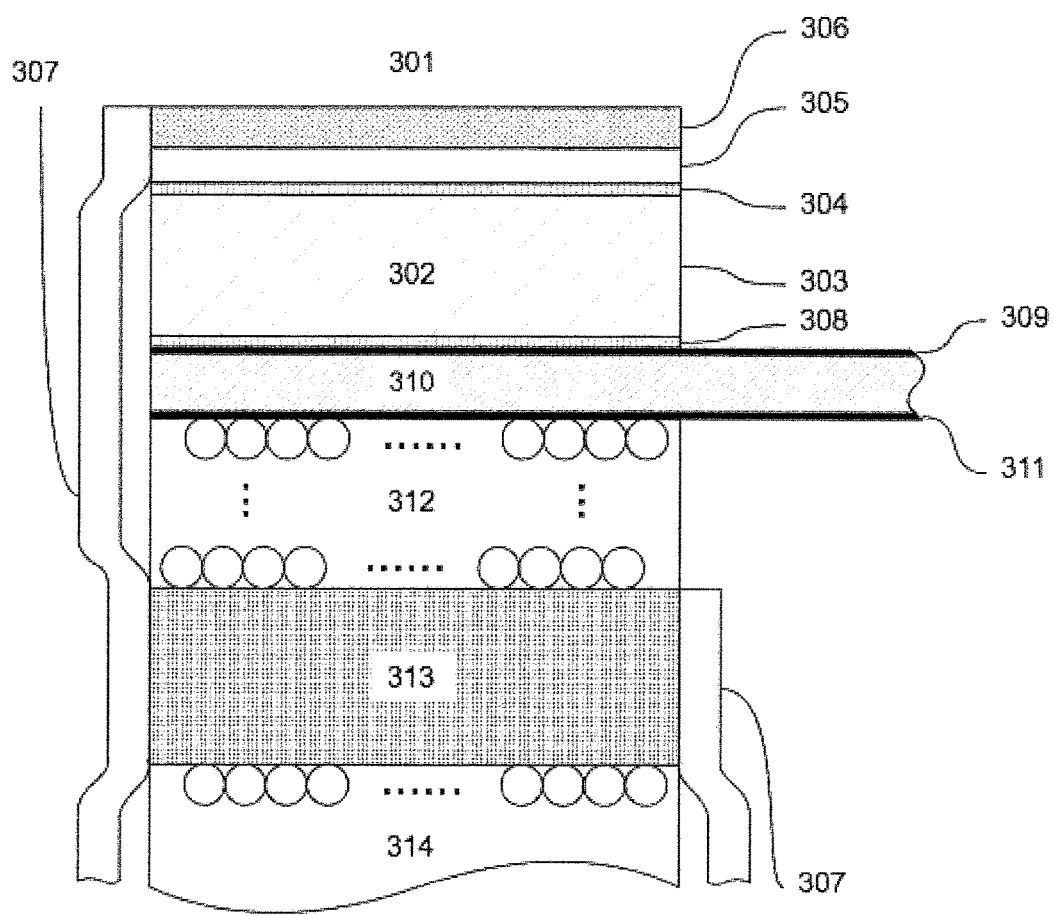
FIG. 3 Illustrates an ultrasound transducer array probe utilizing heat conducting materials according to the invention.

Composite materials comprising base material and particles of the above described type are very useful for acoustic layers in ultrasound transducers to remove heat generated by the transducer assembly and shape transducer bandwidth. An example is shown in FIG. 3, where 300 shows a cross section through a transducer assembly that is designed for acoustic interaction with a load material 301 with a piezo-electric transducer array 302. For illustration purposes only we show a cross section in the elevation direction of a linear array, which shows an array element 303. The piezoelectric layer can be a polymer-ceramic composite according to known methods. The array assembly can be of any form, such as annular array, linear array, 1.5D, 1.75D or 2D matrix array, and the extension from the schematic drawing of FIG. 3 to any form of array, can be implemented by anyone skilled in the art.

In front of the array is a thin metal layer 304 providing the ground electrode for the array element. The metal layer is further connected to two acoustic matching layers 305 and 306, to provide good acoustic coupling to the load material 301. The matching layers are in this example made with thermal conducting materials as exemplified in FIGS. 1 and 2, where specific acoustic impedances of the layers are obtained by at least one of selecting i) a polymer base with specific acoustic impedance, and ii) a polymer core with specific acoustic impedance, and iii) dimension of the polymer core, and iv) type of materials in the coating layers, and v) thickness of the coating layers.

A thick metal electric shielding ground connection 307 is connecting both to the ground electrode 304 and the matching layers 305 and 306 to provide both electrical grounding and heat sink from the electrode and the heat conducting matching layers, and hence also from the array. The matching layers can preferably also be electrically conducting to improve the electric shielding around the array together with the ground electrode 304 and shielding ground connection 307.

The hot element electrode 308 is adhered to the back of the array element 303, and electrical connection to the array elements can for example be obtained with flex print technology where the metal conductor 309 mounted to the flexible isolating layer 310 adheres to the element hot electrodes 308 and connects the element electrodes to outside circuits and/or cables. The connection between the metal conductor and the element electrodes could for example be obtained by soldering, or conducting glue or anisotropic conductive glue or anisotropic film technology. The other side of the flexible isolating material 310 is conveniently coated with a thin metal layer 311 that is further connected to electrical signal ground.

For further improved heat sinking from the array, the array can be matched backwards with a low acoustic impedance layer 312 that has high thermal conductivity, where the thickness of this layer is quarter wavelength at the center frequency of the array. This layer can then connect to a thicker layer 313 with high thermal conductivity, for example a metal layer Cu, Ag, or Al or a semiconductor like Si, to drain heat from the layer 312 and the ultrasound transducer array 302. The acoustic impedance of layer 312 should be much lower (e.g. <5 MRayl) than the acoustic impedance of the layer 313. Si could be used as a substrate for integrated circuits as described in relation to FIGS. 7 and 8 below. The layer 313 can be mounted on a backing material 314 or other acoustic structure as for example shown in FIG. 9.

The layer 313 can further be connected to a heat sinking structure, for example the metal shield ground connection 307. The thermal conducting layer 312 can in this example also preferably have electrical conductivity that further improves the electrical shielding around the array. The flex-print isolating material 310 can also conveniently be made as a composite material of the type in FIG. 1 with the electrically isolating particles in FIG. 2 for improved heat conduction through the layer. The layer 313 can conveniently be mounted on a backing material of absorbing polymer, which also can be heat conducting as described in relation to FIGS. 1 and 2.

Figure 4:
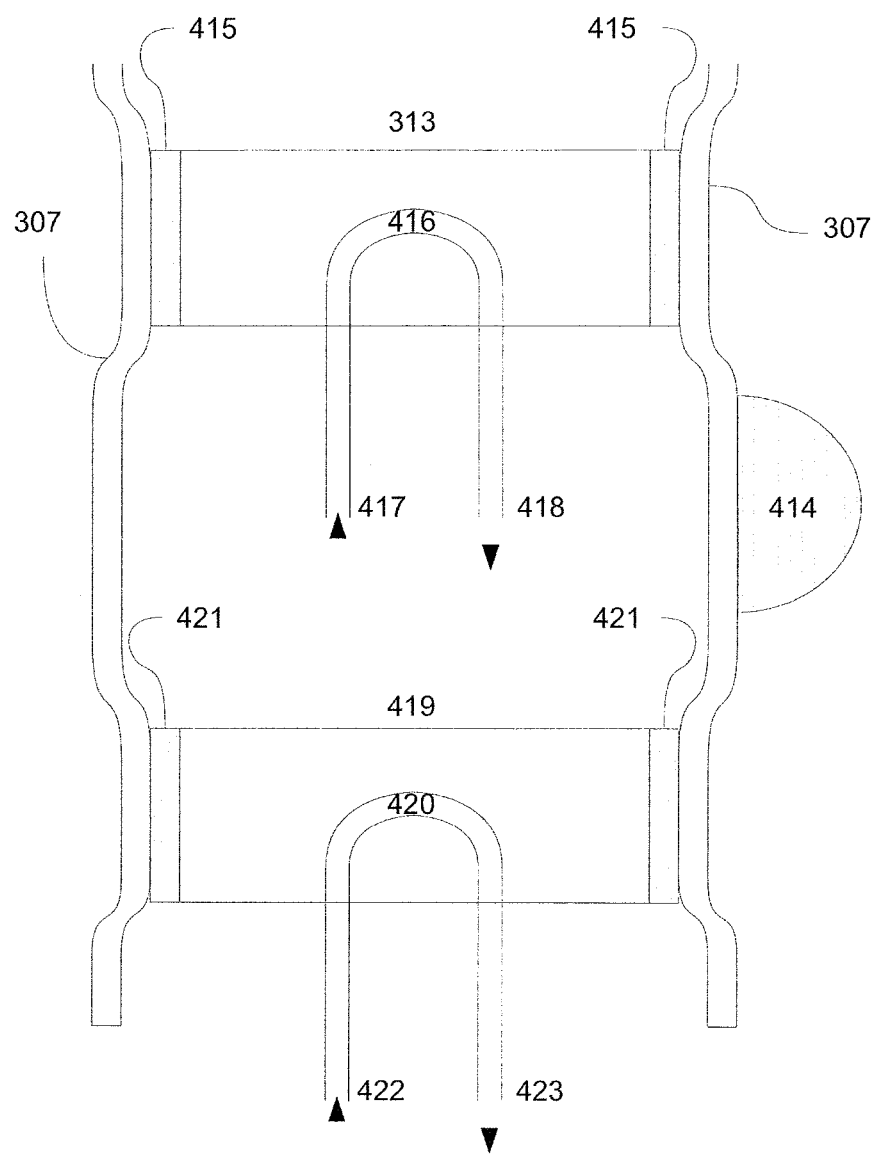
FIG. 4 Shows improved removal of heat from the probe using air-fins, Peltier elements, and fluid cooling FIG. 5 Shows the variation of heat conductivity of the composite material with relative volume fill of Ag of the heat conducting particles in the heat isolating polymer base for 15 µm and 30 µm particle cores.

To further improve removal of heat from the array, external air-fins can be used to remove heat from heat sink 307, for example as illustrated in FIG. 4, where the heat sink 307 is connected to external air cooling fins 414. One can further use Peltier elements, according to known methods, to increase transport of heat from the probe, for example as the Peltier elements 415 shown in FIG. 4 between the layer 313 and the heat sink 307. The Peltier elements pump heat from 313 to 307. Improved removal of heat from the probe, can also be obtained by a streaming fluid, for example through a set of narrow flow channels 416 through the layer 313, which makes 313 into a fluidized cooling element. The flow channels are fed through the inlet tube 417 and the outlet tube 418, and the fluid can via tubes be led to a cooling system at distance from the probe, for example by natural convection, for example enhanced through fluid vaporization and condensation as in the heat pipe technology used in some computers (see, for example, http://en.wikipedia.org/wiki/Heat_pipe), or using a pump, all according to known methods.

Another example of a fluid cooling system is to connect the heat sink 307 to a separate fluid based cooling element 419 with distributed flow channels 420. The cooling element 419 can also conveniently be connected to the heat sink 307 through Peltier elements 421 that pumps heat from the heat sink 307 to the cooling element 419. Fluid is pumped through the flow channels 422 via the inlet tube 423 and the outlet tube 424, and the fluid can via tubes be led to a cooling system at far distance from the probe.

Figure 6:
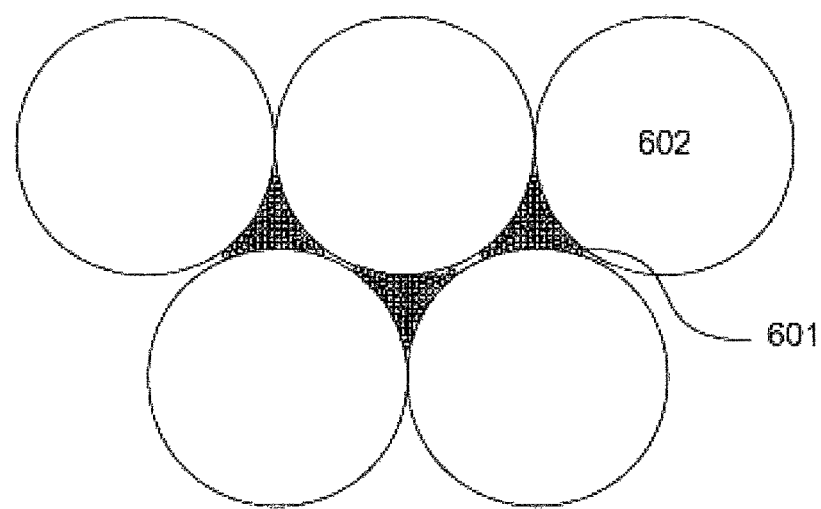
FIG. 6 Shows the use of particles with two different sizes to increase the heat conductivity of the composite material.

FIG. 5 shows an experimental example of obtainable thermal conductivity. The abscissa denotes volume density of silver in a composite material comprising silver coated spheres in a base material, whereas the ordinate denotes thermal conductivity in W/mK. It will be appreciated that, for a given sphere size and coating thickness, the abscissa also indirectly represents the packing density of the particles/spheres and that, for a fixed sphere size and a fixed packing density of the spheres, the abscissa can also be considered to indirectly represent the thickness of the silver coating layer of the spheres. The two lines in FIG. 5 relate to spheres having an average diameter of 15 μm and 30 μm respectively, as indicated in the legend of this Figure. As is illustrated in FIG. 5, The maximal packaging of particles, and hence the maximal thermal conductivity, can be increased by combining particles with a first diameter with particles of a second, different diameter in the composite material. This is illustrated in FIG. 6. The particles with small diameter 601 fill the space between the particles with large diameter 602, increasing the active area of heat conducting layer and hence the heat conductivity of the composite material. A similar effect of denser packaging can be obtained with volumes of particles with a distribution of diameters.

Figure 7:
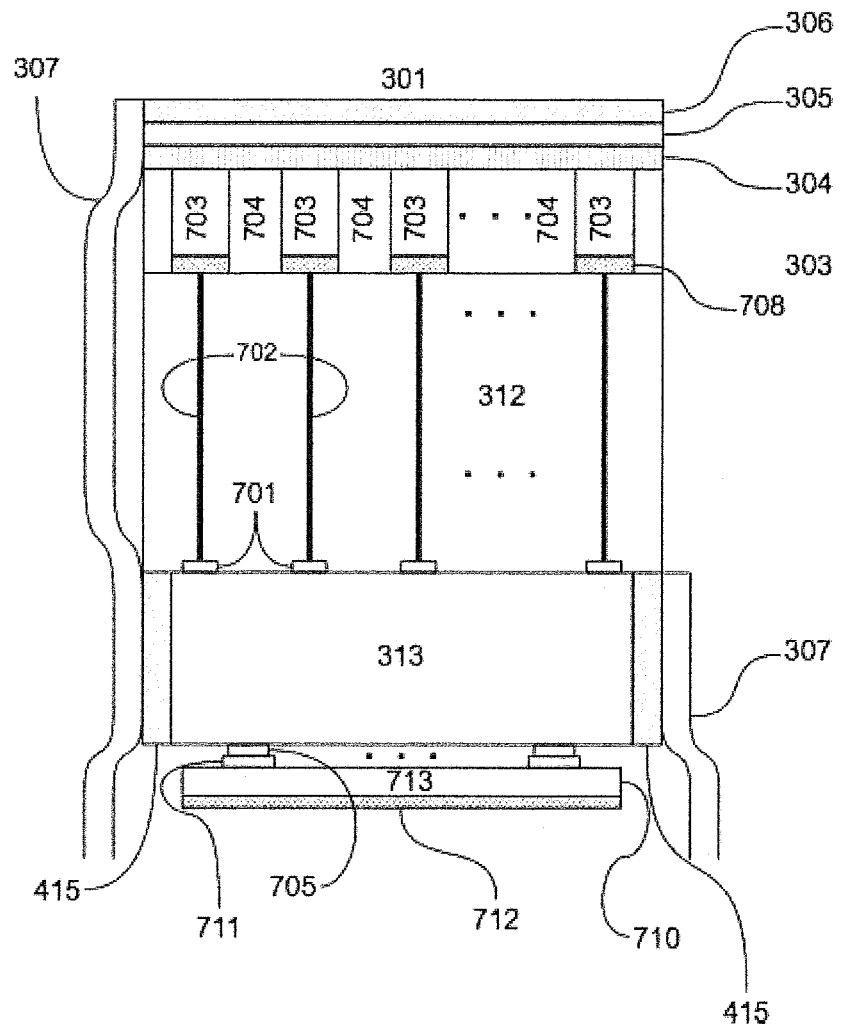
FIG. 7 Shows the use of Si-layers with integrated electronics as combined heat sink and preprocessing of array element signals FIGS. 8a and 8b Shows combined use of large conducting spheres for combined electrical connection to array elements, heat sink, and acoustic layers in an array structure with large number of element FIG. 9 Shows details of backwards extension of the structure in FIG. 3 to include a 2nd transducer array for operation in a lower frequency band to provide a probe for combined operation in a high and a low frequency band.

Further details of the use of the layer 313 of FIG. 3 as a Si-substrate for electronic integrated circuits, are illustrated in FIG. 7. This figure shows a cross section through an array, for example in the azimuth direction through a linear array, or a 1.5D, a 1.75D or a 2D array, which crosses a set of array elements 703 with hot element electrodes 708. The array has a front ground electrode 304, with acoustic matching layers 305 and 306 to the load material 301 as in FIG. 3. The figure also by example shows a heat sink 307 connected to the front electrode, matching layers and the Si layer 313 as in FIG. 3, and can further be connected through Peltier elements 415 by the example in FIG. 4.

The Si-substrate 313 has in this example receiver amplifiers, and potentially also transmit amplifiers, for each array element. The amplifiers are connected to the individual array elements via the connecting surfaces 701 on the Si-substrate 313, and the electrically conducting wires 702 that run through the thermal conducting layer 312 connected to the element electrodes 708. The heat conducting layer 312 is in this case preferably electrically isolating. The space 704 between the array elements is in this example also filled with a heat conducting and electrically isolating composite material similar to that described in FIGS. 1 and 2, and according to an embodiment of the invention, which do not require separate electrical isolation of the electrodes and wires. With further sub-dicing of the elements into a polymer-ceramic composite, the diced volume is conveniently also filled with a heat conducting and electrically isolating polymer composite material, for example according to an embodiment of the present invention. The layer 313 can further be composed of several stacked Si-substrate layers with electric interconnection according to known methods; so that the details of this layered structure is not shown. This allows increased complexity of the integrated circuits and the use of different technology for different layers, where for example a first layer could use high voltage (~100 V) technology for transmit amplifiers, a $2^{nd}$ layer uses technology optimized for low noise receiver amplifiers, and further layers use technology optimized for signal processing, such as signal delays and adding delayed signals from neighboring elements to form sub-aperture signals, all according to known methods.

The back side of the Si-substrate structure can for example connect to the instrument via the surfaces 705 on the back side of the Si-substrate structure, that further connects via a flex print circuit 710 with conducting lines 711, a ground plane 712, separated by an isolation polymer layer 713 to cables and the instrument, according to known methods.

Figure 8A:
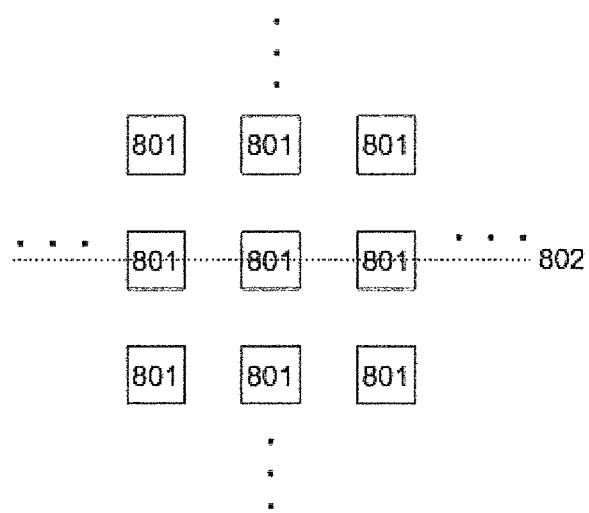
Figure 8B:
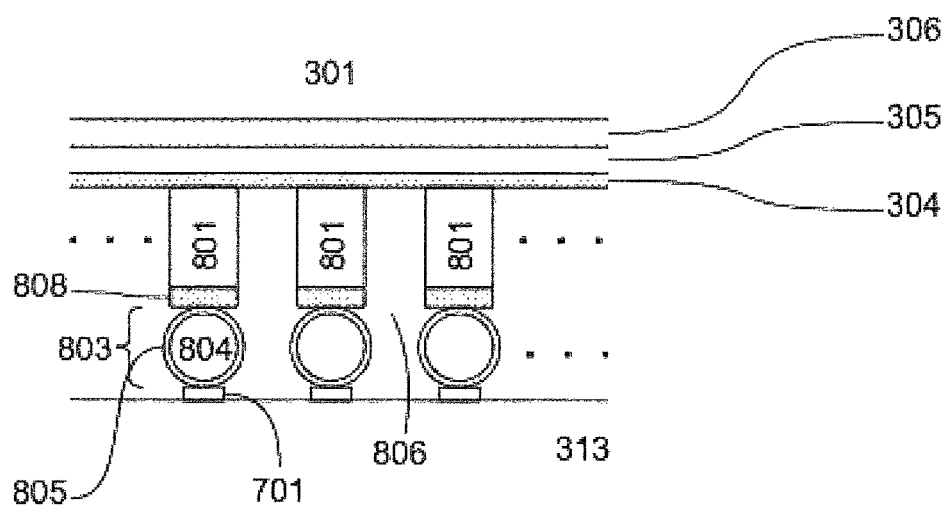
Figure 9:
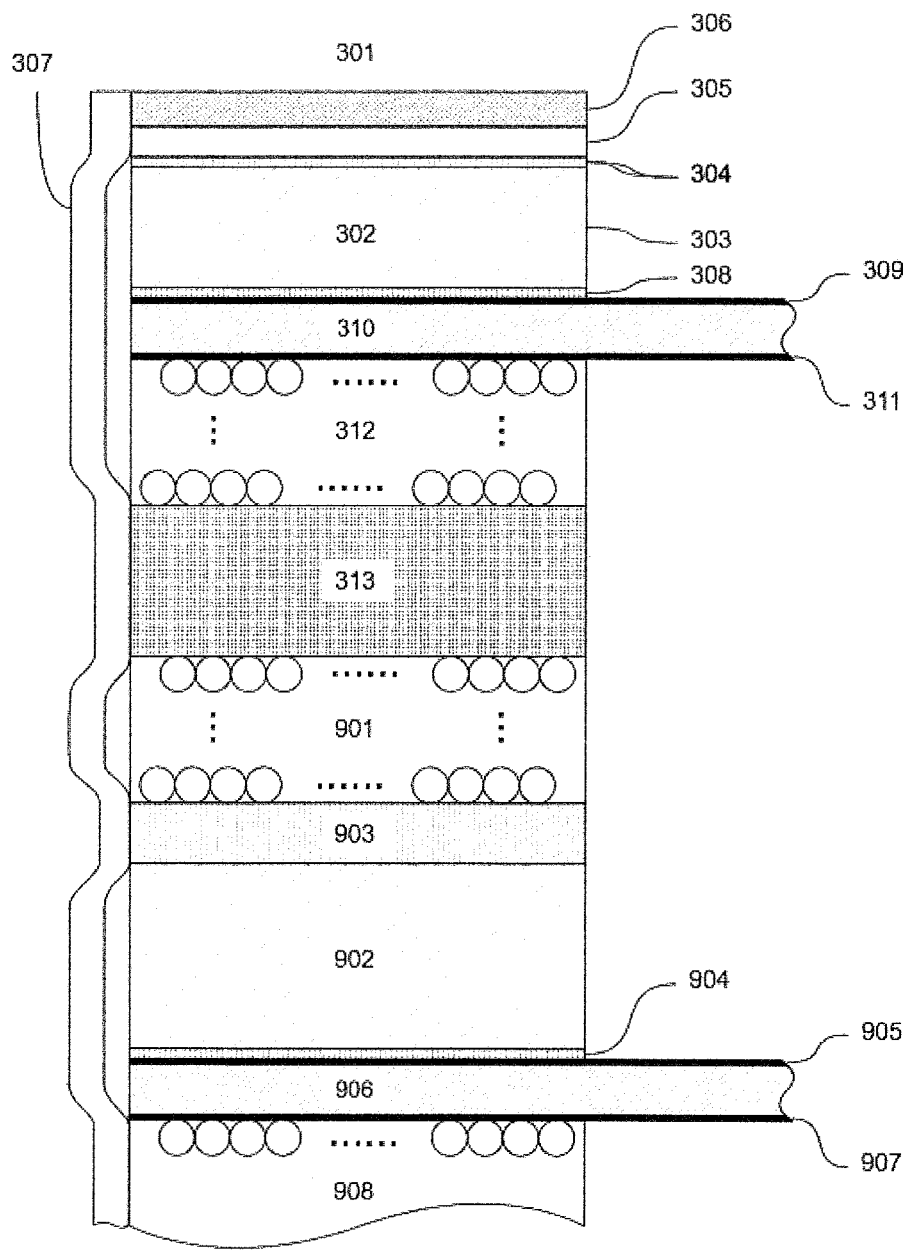

FIG. 8 shows a variation of the apparatus of FIG. 7, which is suitable for arrays with a high number of elements, like 1.75D or 2D arrays. FIG. 8a shows a front view of a part of a 2D array with elements 801, where the line 802 indicates the position of a cross section shown in FIG. 8b. Each element has hot signal electrodes 808 on the back side, with a common ground electrode 304 at the front side, connecting via acoustic matching layers 305 and 306 to the load material 301 as in FIGS. 3 and 7.

The heat conducting Si-substrate layer structure 313 with the conducting surfaces 701 connecting to amplifiers for each element is described in FIG. 7. In the current embodiment, a single sphere 803 with polymer core 804 and electrical and heat conducting layer 805 connects the element electrodes 808 and the conducting surfaces 701, and functions both as electrical conductor between the array elements and the integrated circuits in the Si-structure 301, and as an acoustic impedance inverting (quarter wave) matching structure between Si-structure 301 and the array elements. The impedance inversion transforms the relatively high acoustic impedance of the Si-structure into a low impedance at the back of the array elements, producing an anti-node in the vibration velocity at the back of the array elements in the same way as the layer 312 in FIGS. 3 and 7.

For manufacturing of the structure in FIG. 8b, 1) the spheres 803 can be positioned to the element electrodes 808 by i) electrostatic forces, ii) positioned through a positioning mesh or iii) picked up from a tray using a vacuum tool specially designed for the array in question (as known from traditional ball grid array (BGA) technology). The positioning mesh can for example be made of polymer that is casted in a mould diced in a chemically etchable solid material similar to the dicing in the ceramics for the elements, where the mould is etched away after the hardening of the polymer. One can make an "on-array" positioning mesh where the element electrodes 808 are first made of an overly thick conducting and etchable material, for example Cu, Ag, Al, or Au, and the space between the elements 801 and electrodes 808 is filled to the top of the electrodes with a polymer, preferably a heat conducting and electrically isolating polymer composite material according to an embodiment of the invention. After curing of the polymer fill, a top region of the electrodes is etched away, so that the electrode areas form recesses between the polymer grid walls, 2) the spheres can be adhered to the electrodes for example through i) heating a low temperature solder that is initially attached to the electrodes, or ii) through curing of a conducting glue that is initially attached to the electrodes, 3) After adhering the spheres to the element electrodes, the space 806 between the spheres can be filled with a heat conducting but electrically isolating polymer composite material fill as described in relation to FIG. 7. The space between the array elements can be filled with a similar polymer composite material during the manufacturing of the polymer-ceramic composite, or to form a position grid as described under point 1) above.

4) the Si-layer structure 313 is positioned so that the conducting surfaces 701 are positioned in contact with the matching spheres and elements, and 5) the spheres 803 are adhered to the conducting pads 701 for example through i) heating a low temperature solder that is initially attached to the surfaces, or through ii) curing of a conducting glue that is initially attached to the surfaces, or iii) alternatively, an anisotropic glue could be deposited across the whole surface of the polymer composite material fill under point 3) and the spheres, or iv) alternatively the polymer composite material fill under point 3) could all be an electrically anisotropic glue, that is filled so thick that it just covers the spheres 803. Pressuring the conducting surfaces against the spheres, the anisotropic glue covering the spheres is squeezed so that the conducting particles in the anisotropic glue make electric contact between the conducting surfaces 701 and the spheres 803, according to known methods. One could preferably use an anisotropic glue fill containing both electrically conducting and electrically isolating but thermally conducting spheres, for increased thermal conductivity as described above.

By proper selection of the material of the core and the conducting layer of the spheres, together with the diameter of the spheres, and the fill between the spheres, the spheres with fill can function as an acoustic impedance inverting transformer from the Si-structure to the array elements, similar to the layer 312 in FIGS. 3 and 7.

The structures in FIGS. 3, 4, 7, and 8 can be extended backwards to include arrays operating at lower frequencies, for example according to U.S. Pat. Nos. 7,727,156 and 8,182,428, and as illustrated by example in FIG. 9. The ultrasound array elements 302, 703, and 803 then operates in a high frequency (HF) band, the layers 312 and 313 of this embodiment is part of a backwards isolation section for the HF band as described in the cited US patents. An isolation section of this nature provides at least 10 dB, more preferably at least 30 dB of attenuation to ultrasound waves in the HF band. The HF isolation section is further extended backwards with a low characteristic acoustic impedance (<5 MRayl) layer 901. A low frequency (LF) ultrasound array with array element 902 is mounted to the back of 901 where 903 is the signal ground electrode of the LF element, and 904 is the hot signal element electrode. The frequency ratio between HF and LF may be between 3:1 and 30:1. The structure in this example is mounted on an optional backing material 908. Electric connection to the hot element electrode is in this example obtained with the flex-print circuit with ground plane conducting layer 907 and hot conductor 905 connecting to the hot electrode 904. The layers 312 and 901 of the isolation section and the backing 906 are in this example made of the polymer/particle composite material according to an embodiment of the invention, for example as described in FIG. 1, to drain heat from the arrays. The layers 313 and 903, made of material with high heat conduction further drains heat to the heat sink structure 307 as described above.

Figure 10:
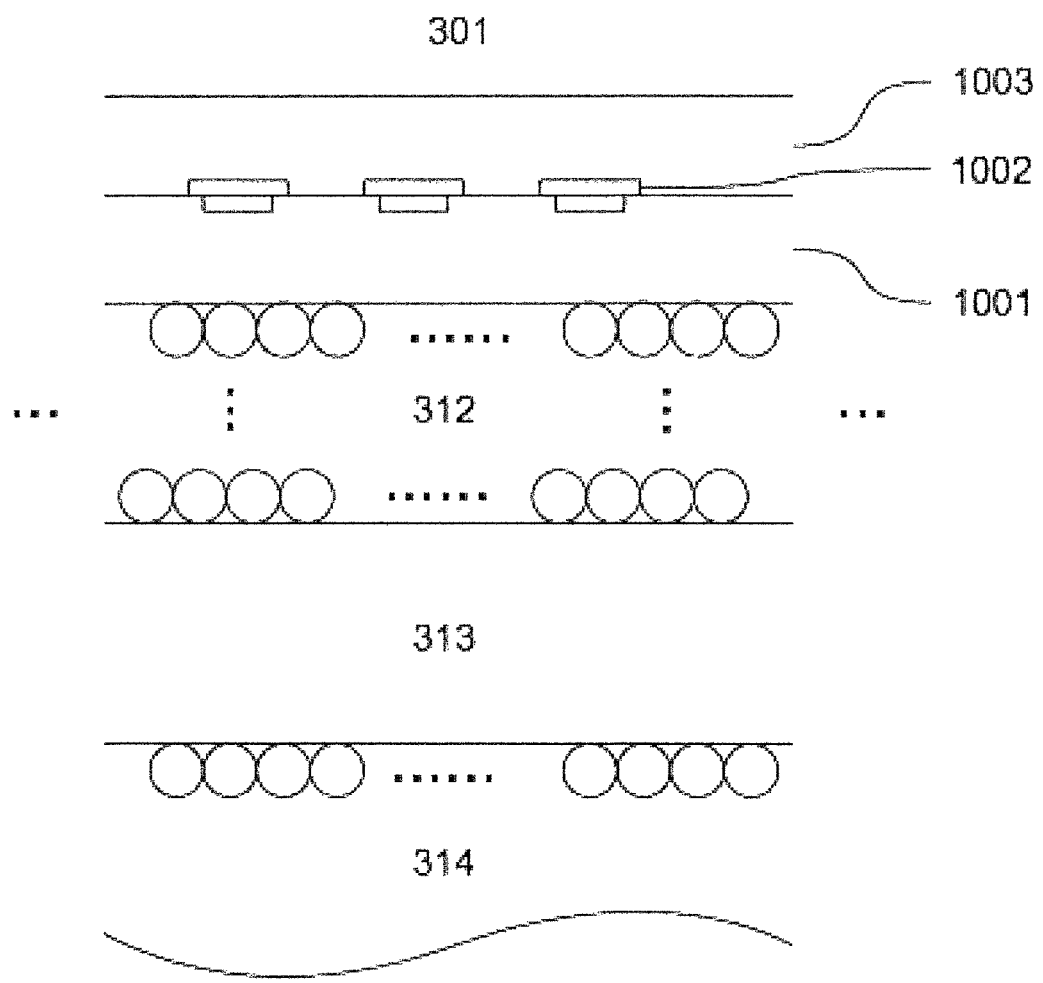
FIG. 10 Shows the use of cmut technology for electro-acoustic transduction according to the invention.

The Figures above are described with reference to the use composites comprising polymer materials and piezo-ceramics for the electro-acoustic transduction of the array elements. The use of other technologies of electro-acoustic transduction is nevertheless envisaged and within the scope of the invention. An example of the use of cmut/pmut technology on a Si-substrate for the electro-acoustic transduction is shown in FIG. 10. 1001 shows the Si-substrate with the vibration membrane drums 1002 on the front side with acoustic connection to the load material 301. The Si-substrate is mounted to the heat conducting polymer composite material 312, and further to a heat draining layer 313 as described in FIG. 3. The structure can be extended backwards for example as shown in FIGS. 3, 4, 7, 8, and 9, and the membranes can be covered by a protecting layer 1003 that also can provide improved impedance matching to the load material 301. Electrical connection to the drums is not shown, as many different solutions are presented in the literature, also through via-holes where connection to the array elements for example can be done as in FIGS. 7 and 8*b*.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention.

It is also expressly intended that all combinations of those elements and/or method steps which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An ultrasound transducer array probe arranged as a layered structure comprising:
    at least one layer of transducer array elements, and
    at least one further layer mounted in acoustic and thermal contact with said layer of transducer elements, said further layer comprises particles comprising a polymer core coated with at least one surface layer of a material having thermal conductivity greater than an amount of thermal conductivity of the polymer core;

wherein the density of particles provides for a large number of particles to be in contact with neighboring particles for thermal conduction through said further layer.

2. The ultrasound transducer array probe according to claim 1, where said particles are contained in a polymer base.

3. The ultrasound transducer array probe according to claim 1, wherein an overall thermal conductivity of said at least one further layer is determined by at least one of i) a type of materials for the particle surface layer, ii) a thickness of the particle surface layer, and iii) a dimension of the particle polymer core, and/or wherein an acoustic property of said at least one further layer is predetermined by at least one of i) a type of material used to form the particle polymer core, ii) a dimension of the particle polymer core, iii) a type of material or types of materials used to form the particle surface layer or layers, and iv) a thickness of the particle surface layer.

4. The ultrasound transducer array probe according to claim 2, wherein an overall thermal conductivity of said at least one further layer is determined by at least one of i) a type of material used to form the polymer base, and ii) a fill density of particles in the polymer base, and/or wherein an acoustic property of said at least one further layer is predetermined by at least one of i) a type of material used to form the polymer base, and ii) a fill density of particles in the polymer base.

5. The ultrasound transducer array probe according to claim 1, wherein said polymer core comprises a porous polymer material.

6. The ultrasound transducer array probe according to claim 1, wherein said at least one layer of transducer elements comprises at least one of, i) piezo-ceramic materials, and ii) cmut/pmut technology.

7. The ultrasound transducer array probe according to claim 1, wherein said surface layer includes an electrically conducting material and wherein a packaging density of said particles within said further layer is such that the electrical conductivity of the surface layers of contacting particles renders said further layer electrically conductive.

8. The ultrasound transducer array probe according to claim 1, wherein said further layer is part of a structure that provides an electrical connection to elements of the transducer array.

9. The ultrasound transducer array probe according to claim 1, wherein said surface layer of heat conductive material includes an electrically isolating material.

10. The ultrasound transducer array probe according to claim 9, wherein said surface layer includes an electrically conducting material coated with an electrically isolating material.

11. The ultrasound transducer array probe according to claim 9, wherein said at least one layer of transducer elements is based on a composite of polymer and ferroelectric ceramic materials, and said polymer is made as a composite material comprising a polymer base comprising particles having a polymer core coated with at least one surface layer of a material that is more thermally conductive than the polymer core, wherein said surface layer of heat conductive material includes an electrically isolating material.

12. The ultrasound transducer array probe according to claim 1, wherein said surface layer of heat conductive material includes layers improving adhesion between the polymer particle and a coating layer, or between coating layers.

13. The ultrasound transducer array probe according to claim 1, wherein said particles are mono-disperse particles.

14. The ultrasound transducer array probe according to claim 1, wherein said particles are composed of at least two groups of particles, each with mono-disperse cores where the particles in different groups have different diameters.

15. The ultrasound transducer array probe according to claim 1, wherein the at least one further layer is placed in thermal contact with a heat draining structure.

16. The ultrasound transducer array probe according to claim 1, wherein the at least one further layer is placed between said at least one electro-acoustic transduction layer and a heat draining layer.

17. The ultrasound transducer array probe according to claim 16, wherein said heat draining layer comprises at least one semiconductor layer with integrated electronics that are connect to array elements.

18. The ultrasound transducer array probe according to claim 1, further comprising at least one of i) air fin cooling, ii) Peltier elements, and iii) fluid cooling, arranged to remove heat from the probe.

19. The ultrasound transducer array probe according to claim 17, wherein electrical connection between the integrated electronics and the array elements is obtained with electrically connections extending through said at least one further layer.

20. The ultrasound transducer array probe according to claim 1, wherein an electrical connection between an array element and an associated electronic component is established via a single one of the particles, and wherein said surface layer of said single one of the particles is electrically conducting.

21. The ultrasound transducer array probe according to claim 19, wherein the composition and dimension of the single particles and potentially also a surrounding fill material is selected so that the single particle together; wherein the potential surrounding fill material functions as an acoustic impedance inverting structure at a frequency within the transmit band of said array elements.

22. The ultrasound transducer array probe according to claim 1, wherein electrical connection between array elements and associated electronic circuits is obtained through an electrically anisotropic adhesive, the adhesive comprising electrically isolating particles and electrically conducting particles, wherein an amount of the electrically conducting particles is lower than an amount of the electrically isolating particles and so low that said adhesive becomes electrically anisotropic.

23. The ultrasound transducer array probe according to claim 22, wherein the electrically conducting particles are larger than the electrically isolating particles.

24. The ultrasound transducer array probe according to claim 1, wherein the array probe is configured to operate at two separate frequency bands, hereinafter referred to as higher frequency band and lower frequency band, respectively, wherein said at least one layer of transducer array elements comprises an array operative in the higher frequency band, and the probe comprises a further transducer array layer operating in the lower frequency band, and wherein the at least one further layer and a further transducer array layer operating in the lower frequency band are provided on a side of the array operating in the higher frequency band that is opposite to an emission side of the array operating in the higher frequency band.

25. The ultrasound transducer array probe according to claim 24, wherein said at least one further layer between the arrays comprises two composite material layers, and, between the two composite material layers, a layer made of a material that has a thermal conductivity that is at least five times the thermal conductivity of said composite material layers, wherein said composite material layers comprise a polymer base filled with particles comprising a polymer core that is coated with a surface layer of a material that is more thermally conductive than the polymer core.

26. A method of manufacturing an ultrasound transducer array as a layered structure comprising:
selecting, for a layer comprising particles with a polymer core coated with at least one surface layer of a material that is more thermally conductive than the polymer core, wherein the density of the particles provides for a large number of said particles to be in contact with neighboring ones of said particles for thermal conduction through said layer, at least one of:
an overall thermal conductivity of said layer by selecting at least one of i) a type of material for the particle surface layer, ii) a thickness of the particle surface layer, and iii) a dimension of the particle polymer core, and
an acoustic property of said layer by selecting at least one of i) a type of material in the polymer base, ii) a type of material in the particle polymer core, iii) a dimension of the particle polymer core, iv) a type of material in the particle surface layer, and v) a thickness of the particle surface layer, and
attaching said layer in acoustic and thermal contact to an ultrasound transducer array for heat conduction.

27. A method of manufacturing an ultrasound transducer array comprising:
creating a composite layer from a polymer base material having embedded particles, said particles comprising a polymer core coated with a surface layer of material with higher thermal conductivity than the polymer core and polymer base material, wherein the density of the embedded particles provides for a large number of said particles to be in contact with neighboring ones of said particles for thermal conduction through said composite layer, at least one of:
an overall thermal conductivity of said composite layer is determined by selecting at least one of i) a type of material for the particle surface layer, ii) a thickness of the particle surface layer, iii) a dimension of the particle polymer core, and iv) a volume fill of said particles in the polymer base, and
an acoustic property of said composite layer is determined by selecting at least one of i) a type of material in the polymer base, ii) a type of material in the particle polymer core, iii) a dimension of the particle polymer core, iv) a type of materials in the particle surface layer, v) a thickness of the particle surface layer, and vi) a volume fill density of particles in the polymer base; and
attaching said composite material layer to an ultrasound transducer array for heat conduction.

28. An ultrasound transducer probe arranged as a layered structure comprising:
at least one first layer comprising at least one transducer element, and
at least one second layer mounted in acoustic and thermal contact with said at least one first layer, said at least one second layer comprising polymer core coated particles having a surface of a material having thermal conductivity greater than thermal conductivity of the polymer core; wherein the density of particles provides for a large number of polymer core coated particles to be in contact with neighboring polymer core coated particles for thermal conduction through said at least one second layer.

* * * * *